(12) United States Patent
Nishimura

(10) Patent No.: US 9,916,026 B2
(45) Date of Patent: Mar. 13, 2018

(54) ELECTRONIC DEVICE AND CONTROL METHOD FOR ELECTRONIC DEVICE

(71) Applicant: KYOCERA CORPORATION, Kyoto (JP)

(72) Inventor: Yasuhiko Nishimura, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 13/871,798

(22) Filed: Apr. 26, 2013

(65) Prior Publication Data

US 2013/0285958 A1 Oct. 31, 2013

(30) Foreign Application Priority Data

Apr. 26, 2012 (JP) ................. 2012-101430

(51) Int. Cl.
*G06F 3/041* (2006.01)
*G06F 3/01* (2006.01)
*G06F 3/0483* (2013.01)
*G06F 3/0485* (2013.01)
*G06F 3/0488* (2013.01)

(52) U.S. Cl.
CPC ............ *G06F 3/0416* (2013.01); *G06F 3/016* (2013.01); *G06F 3/0483* (2013.01); *G06F 3/0485* (2013.01); *G06F 3/04883* (2013.01)

(58) Field of Classification Search
CPC ........ G06F 3/041; G06F 3/0488; G06F 3/167; G06F 3/0482; G06F 3/0416; G06F 3/016; G06F 3/0483; G06F 3/04883; G06F 3/0485

USPC .......... 715/727, 810, 863; 345/173
See application file for complete search history.

(56) References Cited

U.S. PATENT DOCUMENTS

| | | | |
|---|---|---|---|
| 8,378,979 B2 * | 2/2013 | Frid et al. ........... | 345/173 |
| 2009/0102805 A1 * | 4/2009 | Meijer ............ | G06F 3/016 345/173 |
| 2009/0189749 A1 * | 7/2009 | Salada ........... | 340/407.2 |

(Continued)

FOREIGN PATENT DOCUMENTS

| | | |
|---|---|---|
| JP | 2000-163193 A | 6/2000 |
| JP | 2004-362428 A | 12/2004 |

(Continued)

OTHER PUBLICATIONS

An Office Action; "Decision of Rejection," issued by the Japanese Patent Office dated Apr. 26, 2016, which corresponds to Japanese Patent Application No. 2012-101430 and is related to U.S. Appl. No. 13/871,798; with English language concise explanation.

(Continued)

*Primary Examiner* — Ilana Spar
*Assistant Examiner* — Brent D Castiaux
(74) *Attorney, Agent, or Firm* — Studebaker & Brackett PC

(57) ABSTRACT

An electronic device (1) is provided with a display unit (20), a contact detection unit (30) that detects contact, a vibration unit (40) that vibrates the contact detection unit (30), and a control unit (10), such that the contact detection unit (30) detects contact, the control unit (10) changes a display page of information displayed on the display unit (20) and causes the vibration unit (40) to vibrate the contact detection unit (30) in accordance with the change of the display page.

8 Claims, 4 Drawing Sheets

(56) References Cited

U.S. PATENT DOCUMENTS

| | | | |
|---|---|---|---|
| 2010/0001849 A1* | 1/2010 | Lee | G06F 3/016 340/407.2 |
| 2010/0188327 A1* | 7/2010 | Frid et al. | 345/156 |
| 2010/0231539 A1* | 9/2010 | Cruz-Hernandez | G06F 3/016 345/173 |
| 2011/0039602 A1* | 2/2011 | McNamara | G06F 3/017 455/566 |
| 2011/0050594 A1* | 3/2011 | Kim et al. | 345/173 |
| 2012/0038582 A1* | 2/2012 | Grant | G06F 3/016 345/174 |
| 2012/0066591 A1 | 3/2012 | Hackwell | |
| 2012/0084704 A1* | 4/2012 | Lee et al. | 715/776 |
| 2012/0098836 A1* | 4/2012 | Kim | G06F 3/0483 345/473 |
| 2012/0268412 A1* | 10/2012 | Cruz-Hernandez | G06F 3/0488 345/174 |
| 2013/0088438 A1* | 4/2013 | Shih et al. | 345/173 |

FOREIGN PATENT DOCUMENTS

| | | |
|---|---|---|
| JP | 2011-090575 A | 5/2011 |
| WO | 2010/028944 A1 | 3/2011 |
| WO | 2011/028944 A1 | 3/2011 |

OTHER PUBLICATIONS

An Office Action; "Notice of Reasons for Rejection," issued by the Japanese Patent Office dated Nov. 17, 2015, which corresponds to Japanese Patent Application No. 2012-101430 and is related to U.S. Appl. No. 13/871,798; with English language concise explanation.

\* cited by examiner

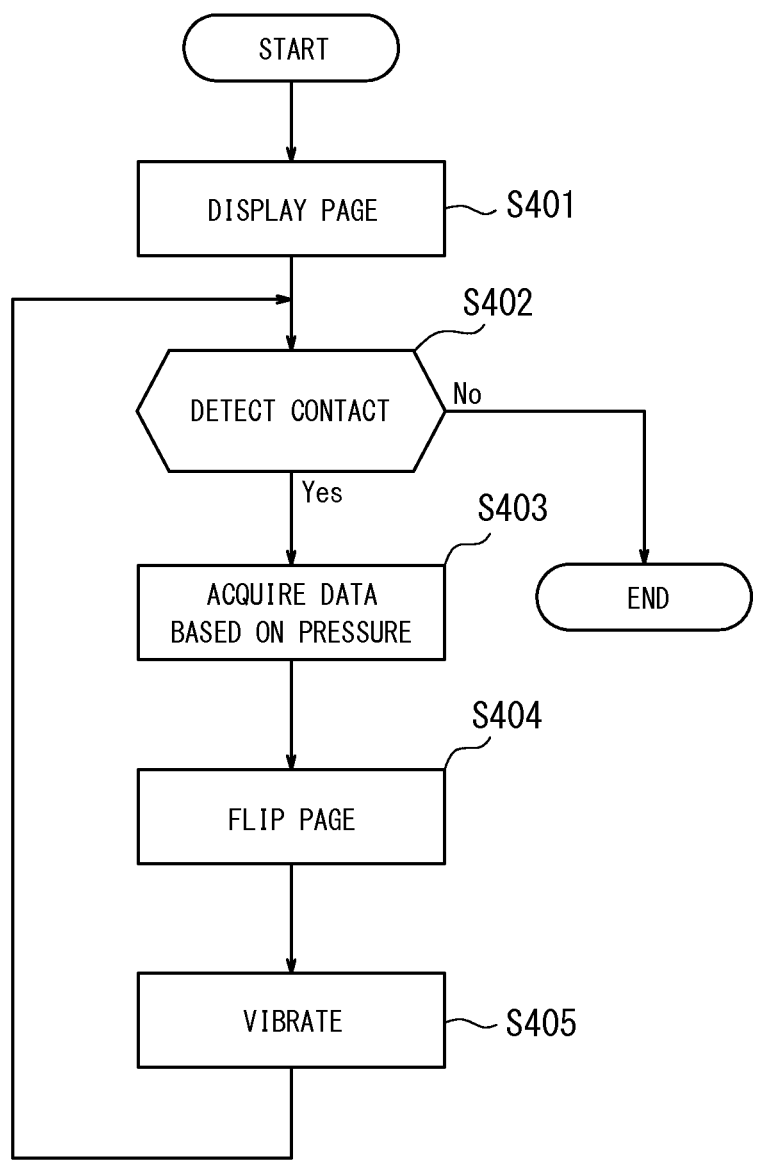

ELECTRONIC DEVICE AND CONTROL METHOD FOR ELECTRONIC DEVICE

CROSS REFERENCE TO RELATED APPLICATION

This application claims priority to and the benefit of Japanese Patent Application No. 2012-101430 (filed on Apr. 26, 2012), the entire contents of which are incorporated herein by reference.

FIELD

Embodiments discussed herein relate to an electronic device and a control method for an electronic device.

BACKGROUND

In recent years, practical use has been made of electronic devices that transition the page of a browser, electronic book or the like displayed on a display unit based on operations input into a contact detection unit, such as a touch sensor. For example, Patent Literature 1 listed below discloses an electronic device that, when a user contacts a finger to a predetermined location on the screen with a predetermined pressure, performs successive page flips for the duration of the contact while consecutively displaying image information in each updated page on the display unit. With this electronic device, the user can display a desired page on the display unit by watching the images and releasing the finger at the desired page.

CITATION LIST

Patent Literature 1: JP2000-163193(A)

SUMMARY

With the electronic device disclosed in Patent Literature 1, however, the user is required to pay attention to the image information in the pages being displayed on the display unit and recognize the currently displayed page in order not to flip pages beyond the desired page. During successive page flips, the display unit must be continually viewed throughout the operation. Such continual viewing might be stressful for the user.

In view of the foregoing, an electronic device and a control method for an electronic device that allow a user to reliably recognize a page flip operation without looking at the display unit and that reduce stress on the user is discussed hereafter.

An electronic device according to an aspect includes: a display unit; a contact detection unit configured to detect contact; a vibration unit configured to vibrate the contact detection unit; and a control unit configured, when the contact detection unit detects contact, to change a display page on the display unit and cause the vibration unit to vibrate the contact detection unit in accordance with change of the display page.

In the electronic device according to an aspect, the control unit preferably detects a contact pattern on the contact detection unit and, based on the contact pattern, alters a number of display pages changed at a time.

The electronic device according to an aspect preferably further includes a pressure detection unit configured to detect pressure on the contact detection unit, wherein the control unit detects the contact pattern as the pressure detected by the pressure detection unit.

In the electronic device according to an aspect, the control unit preferably alters vibration of the vibration unit in accordance with the number of display pages changed at a time.

In the electronic device according to an aspect, the control unit preferably alters vibration of the vibration unit by altering a drive signal provided to the vibration unit.

A control method for an electronic device according to an aspect is a control method for an electronic device provided with a display unit, a contact detection unit configured to detect contact, and a vibration unit configured to vibrate the contact detection unit. The control method includes the steps of: detecting contact to the contact detection unit; changing a display page on the display unit upon detection of the contact to the contact detection unit; and causing the vibration unit to vibrate the contact detection unit in accordance with change of the display page.

BRIEF DESCRIPTION OF DRAWINGS

Embodiments will be further described below with reference to the accompanying drawings, wherein:

FIG. 4 is a flowchart schematically illustrating operations of the electronic device in FIG. 3.

DESCRIPTION OF EMBODIMENTS

According to the embodiments described below, a user may reliably recognize a page flip operation without looking at the display unit, and the stress placed on the user may be reduced.

Embodiments will be described with reference to the accompanying drawings.

Embodiment 1

Figure 1:
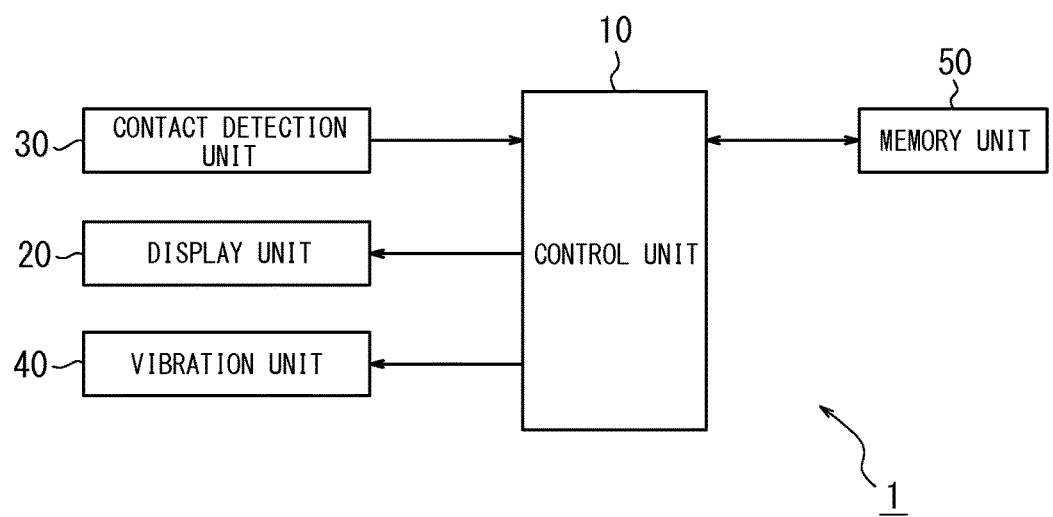
FIG. 1 is a functional block diagram schematically illustrating the configuration of an electronic device according to Embodiment 1.

FIG. 1 is a functional block diagram schematically illustrating the configuration of an electronic device according to Embodiment 1. An electronic device 1 illustrated in FIG. 1 is provided with a control unit 10, a display unit 20, a contact detection unit 30, a vibration unit 40 and a memory unit 50.

The control unit 10 controls and manages the entire electronic device 1 by controlling each functional block constituting the electronic device 1. Among processing by the control unit 10, processing particular to the present embodiment is described below.

The display unit 20 displays images (pages), input objects such as icons and push buttons, and the like for application software (hereinafter simply referred to as an "application") such as a browser, an electronic book and the like. The display unit 20 may be, for example, constituted by a liquid crystal display panel, an organic EL display panel, electronic paper or the like.

The contact detection unit 30 is provided on the front face of the display unit 20 and, when an operator contacts an object displayed on the display unit 20 with a finger, a stylus pen or the like (hereinafter collectively referred to as a "contact object"), detects the contact on a corresponding touch (contact) face of the contact detection unit 30. The contact detection unit 30 detects the position of the contact by the contact object on the touch face and notifies the control unit 10 of the position of the detected contact. The contact detection unit 30 may, for example, be constituted by a touch sensor that is a resistive film type, a capacitive type, an optical type or the like.

The vibration unit 40 vibrates the contact detection unit 30 and may be, for example, constituted by any number of piezoelectric elements attached around the contact detection unit 30. By causing the contact detection unit 30 to vibrate in a predetermined vibration pattern, the vibration unit 40 provides a tactile sensation to the contact object that is contacting the touch face. In the present embodiment, the vibration unit 40 produces vibration based on a drive signal provided by the control unit 10. In other words, the control unit 10 controls the vibration unit 40 to vibrate. When doing so, the control unit 10 may also vary the drive signal that drives the vibration unit 40 in accordance with the position of the contact by the contact object as detected by the contact detection unit 30. The control unit 10 may thus control different types of vibration to be generated in accordance with the object, displayed on the display unit 20, that corresponds to the position of the contact detected by the contact detection unit 30.

The memory unit 50 may be, for example, constituted by flash memory or the like and stores a variety of information, such as a variety of applications executable by the electronic device 1.

Figure 2:
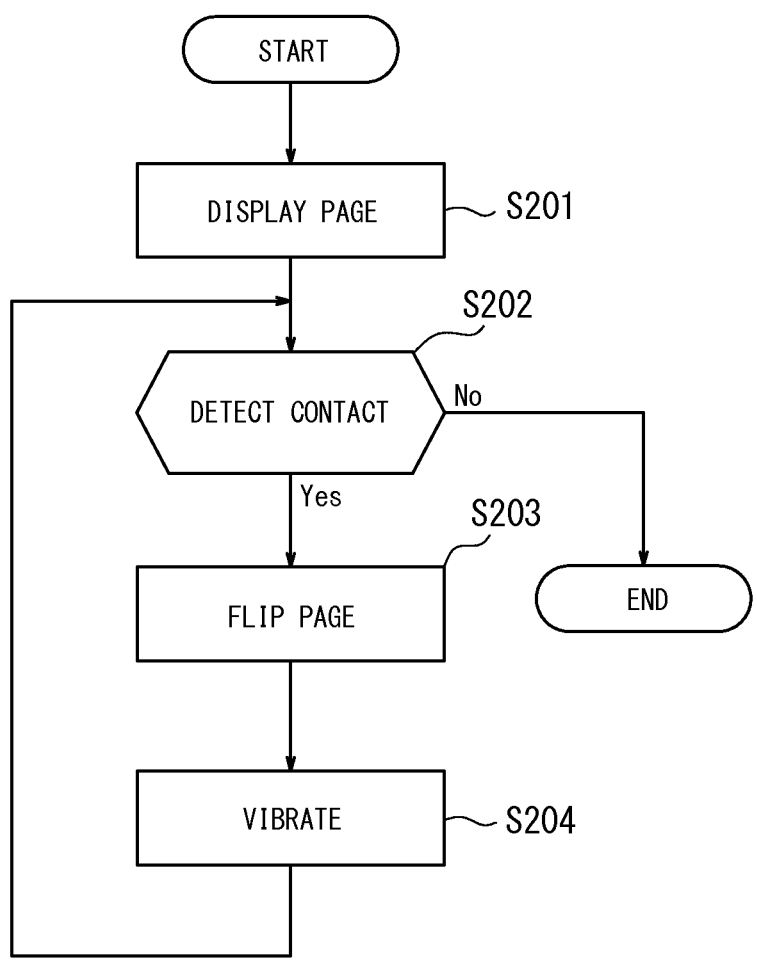
FIG. 2 is a flowchart schematically illustrating operations of the electronic device in FIG. 1.

Next, operations of the electronic device 1 according to the present embodiment will be schematically described with reference to the flowchart in FIG. 2.

First, the control unit 10 displays an image (page) for a running application on the display unit 20 (step S201). Next, the control unit 10 monitors for detection by the contact detection unit 30 of contact related to a page flip (step S202). When the contact is detected, the control unit 10 executes page flip processing in response to the contact input to flip the page forward or backward and displays the next page or the previous page on the display unit 20 (step S203).

In synchronization with the page flip processing in step S203, the control unit 10 also drives the vibration unit 40 with a predetermined drive signal to vibrate the contact detection unit 30 for a fixed length of time with a predetermined vibration pattern (step S204). The fixed length of time for vibrating the contact detection unit 30 is appropriately set to be equal to or less than the time required for the page flip processing. In synchronization with a page flip, the control unit 10 thus provides a tactile sensation to the user contacting the contact detection unit 30.

As long as the contact related to a page flip is detected by the contact detection unit 30 in step S202, the control unit 10 repeats the page flip processing in step S203 and the vibration processing in step S204. When no contact is detected in step S202, i.e. when the contact object such as a finger or the like is released from the contact detection unit 30, the control unit 10 terminates the page flip processing. Accordingly, when the user continually contacts the contact detection unit 30, pages are flipped successively while a tactile sensation is provided in synchronization with each page flip. Or, when the user intermittently contacts the contact detection unit 30, pages are flipped intermittently while a tactile sensation is provided in synchronization with each page flip.

In this way, when contact related to a page flip is detected on the contact detection unit 30, the electronic device 1 according to the present embodiment executes page flipping while providing the user with a tactile sensation by vibrating the contact detection unit 30 via the vibration unit 40 in synchronization with the page flipping. Accordingly, the user can recognize the page flip operation by the tactile sensation, making it possible for the user to display the desired page on the display unit 20 without paying attention to the display unit 20. Therefore, in particular during successive page flips, it is possible to reduce the stress on the user produced by the need to continually pay attention to the display unit 20.

Embodiment 2

Figure 3:
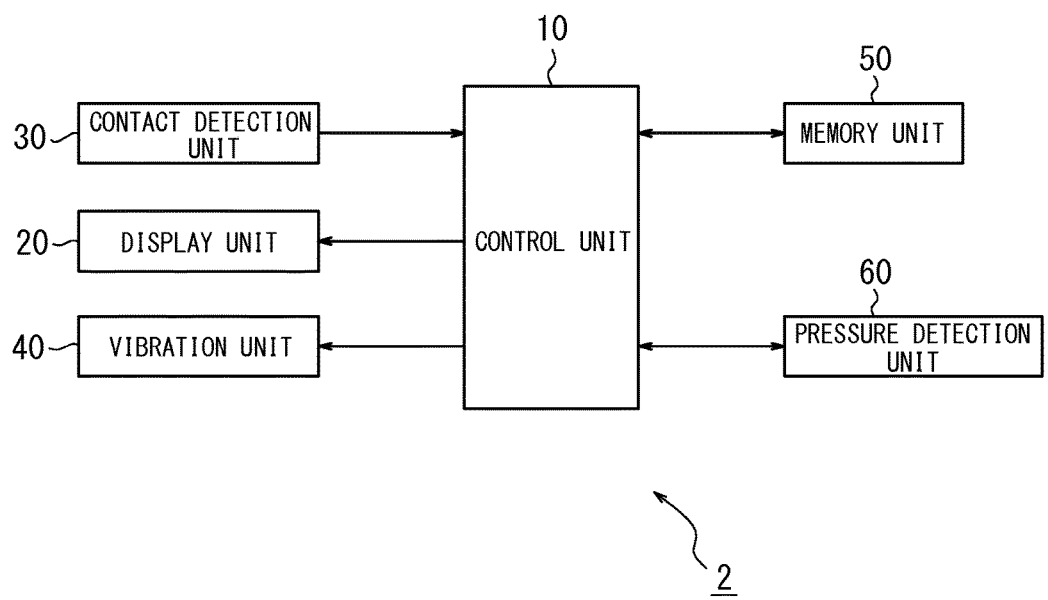
FIG. 3 is a functional block diagram schematically illustrating the configuration of an electronic device according to Embodiment 2.

FIG. 3 is a functional block diagram schematically illustrating the configuration of an electronic device according to Embodiment 2. An electronic device 2 illustrated in FIG. 3 has the structure illustrated in FIG. 1, with the change that the control unit 10 detects a contact pattern on the contact detection unit 30 and alters the number of pages to be flipped by each page flip in accordance with the contact pattern, i.e. alters the number of display pages changed at a time on the display unit 20. Therefore, the electronic device 2 of the present embodiment is further provided with a pressure detection unit 60 that detects pressure on the contact detection unit 30 as a contact pattern.

The pressure detection unit 60 detects pressure on the touch face of the contact detection unit 30 and may be, for example, constituted by a strain gauge sensor, a piezoelectric element or the like that experiences a change in physical or electrical characteristics (strain, resistance, voltage or the like) in response to pressure. Voltage is an electrical characteristic of a piezoelectric element, and when the pressure detection unit 60 is constituted by a piezoelectric element, for example, the magnitude of the voltage (voltage value, hereinafter simply referred to as "data") changes in accordance with the magnitude of the load (force) of the pressure on the touch face of the contact detection unit 30 (or the speed at which the magnitude of the load (force) changes (acceleration)). Note that when the vibration unit 40 is constituted by a piezoelectric element, the pressure detection unit 60 may share the piezoelectric element in common with the vibration unit 40.

The control unit 10 acquires the data by being notified of the data by the pressure detection unit 60 or by detecting the data of the pressure detection unit 60. In other words, as the contact pattern of the contact object on the contact detection unit 30, the control unit 10 acquires data based on pressure on the touch face of the contact detection unit 30 from the pressure detection unit 60.

The memory unit 50 also stores a plurality of reference values for the pressure-based data of the pressure detection unit 60 and the number of pages changed at a time for each reference value. Furthermore, the memory unit 50 stores a drive signal for the vibration unit 40 in correspondence with each reference value. The remaining configuration is the same as in FIG. 1, and thus a description is omitted.

Operations of the electronic device 2 according to the present embodiment will now be schematically described with reference to the flowchart in FIG. 4.

First, the control unit 10 displays an image (page) for a running application on the display unit 20 (step S401). Next, the control unit 10 monitors for detection by the contact detection unit 30 of contact related to a page flip (step S402). Upon detection of the contact, the control unit 10 acquires pressure-based data based on pressure on the contact detection unit 30 from the pressure detection unit 60 at, for example, a predetermined timing (step S403) and detects the maximum reference value satisfied by the acquired data (step S404).

When one of the reference values is detected in step S404, the control unit 10 executes page flip processing in response to the contact input to flip the page forward or backward, using the number of pages changed at a time corresponding to the reference value, and then displays the page that is transitioned to on the display unit 20 (step S404). For example, if the maximum reference value satisfied by the pressure-based data is the smallest reference value, one page is flipped, and if the maximum reference value is the next largest reference value, two pages are flipped. The page that is transitioned to is then displayed on the display unit 20.

In synchronization with the page flip processing in step S404, the control unit 10 also drives the vibration unit 40 with a drive signal corresponding to the reference value (step S405). As a result, the vibration unit 40 causes the contact detection unit 30 to vibrate with a vibration pattern corresponding to the number of display pages changed at a time. For example, when flipping one page, the control unit 10 drives the vibration unit 40 with a drive signal having a small amplitude or low frequency, causing the contact detection unit 30 to vibrate with a first vibration pattern. When flipping two pages, the control unit 10 drives the vibration unit 40 with a drive signal having a large amplitude or a high frequency, causing the contact detection unit 30 to vibrate with a second vibration pattern different from the first vibration pattern. Note that the length of time to vibrate the contact detection unit 30 is the same as in Embodiment 1. In accordance with the number of pages changed at a time, the control unit 10 thus provides a tactile sensation to the user contacting the contact detection unit 30.

As long as the contact related to a page flip is detected by the contact detection unit 30 in step S402, the control unit 10 repeats the processing in steps S403 to S405. When no contact is detected in step S402, the control unit 10 terminates the page flip processing.

With the present embodiment, when the desired page is near the currently displayed page, the user can press the contact detection unit 30 with a relatively weak pressure to perform one-page flips, for example. In this way, the user may cause the page displayed on the display unit 20 to transition to the desired page while recognizing each one-page flip operation by the tactile sensation corresponding to the one-page flip.

When the desired page is distant from the currently displayed page, the user can first press the contact detection unit 30 with a relatively strong pressure to perform two-page flips, for example. In this way, the user may cause the display page to transition while recognizing each two-page flip operation by the tactile sensation corresponding to the two-page flip. Subsequently, upon approaching the desired page, the user lessens the pressure to perform one-page flips. The user can thus efficiently cause the page displayed on the display unit 20 to transition to the desired page.

Therefore, according to the present embodiment as well, as with Embodiment 1, the user may recognize the page flip operation by the tactile sensation without paying attention to the display unit 20, thereby reducing the stress on the user. Moreover, since the number of pages changed at a time is altered in accordance with pressure on the contact detection unit 30, the user may efficiently flip pages. Furthermore, varying the provided tactile sensation in accordance with the number of pages changed at a time allows the user to easily recognize the current number of pages changed at a time.

It is to be understood that the present invention is not limited to the embodiments set forth above, and various changes and modifications may be implemented. For example, in Embodiment 2, the same tactile sensation may be provided with the same drive signal of the vibration unit 40 regardless of the number of display pages changed at a time. Also, the contact pattern on the contact detection unit 30 detected by the control unit 10 may be a contact pattern consisting of a sweep amount or vector of the contact object on the contact detection unit 30, or a contact pattern consisting of any combination of pressure, sweep amount, and vector.

The pressure detection unit 60 may be configured in accordance with the type of contact detection of the contact detection unit 30. For example, in the case of resistive film type contact detection, the magnitude of resistance corresponding to the size of the contact area may be detected in association with the load (force) of the pressure on the touch surface of the contact detection unit 30. Alternatively, in the case of capacitive type touch detection, the magnitude of capacitance may be detected in association with the load (force) of the pressure on the touch surface of the contact detection unit 30.

In the above-described embodiments, the vibration unit 40 may be constituted by disposing a transparent piezoelectric element across the entire surface of the contact detection unit 30 or by using an eccentric motor.

The display unit 20 and the contact detection unit 30 may be constituted by an integrated apparatus, for example by providing a common substrate with both functions. An example of such an apparatus is a liquid crystal panel having a matrix of pixel electrodes, with a plurality of photoelectric conversion elements, such as photodiodes, regularly mixed therein. Such an apparatus is contacted by a pen for contact input at a desired position on the panel display, and while displaying images with the liquid crystal panel structure, the apparatus can detect a contact position by light from a backlight for liquid crystal display being reflected by the tip of the pen and received by surrounding photoelectric conversion elements.

REFERENCE SIGNS LIST 1, 2: Electronic device
10: Control unit
20: Display unit
30: Contact detection unit
40: Vibration unit
50: Memory unit
60: Pressure detection unit

The invention claimed is:
1. An electronic device comprising:
a display unit;
a contact detector communicatively connected to a processor; a vibration unit; and
a control unit,
wherein, while the contact detector continuously detects contact, the control unit changes a display page on the display unit and causes the vibration unit to vibrate the contact detector, within a time required for the change of the display page, with a first vibration pattern having within a predetermined length of time a first amplitude or a first frequency of vibration in accordance with a first number of pages changed within the predetermined length of time, and a second vibration pattern having within the predetermined length of time a second amplitude or a second frequency of vibration in accor- dance with a second number of pages changed within the predetermined length of time, wherein the first amplitude or first frequency of vibration is different than the second amplitude or the second frequency of vibration, wherein the first number of pages is different than the second number of pages, and wherein the predetermined length of time for the first vibration is the same as the predetermined length of time for the second vibration, and, when the contact detector no longer detects the contact, stops changing the display page on the display unit and stops causing the vibration unit to vibrate the contact detector, wherein the control unit causes the vibration unit to vibrate the contact detector differently according to an object displayed by the display unit at the contact, wherein the predetermined length of time is less than a changing the display page length of time.

2. The electronic device according to claim 1, wherein the control unit detects a contact pattern on the contact detector and, based on the contact pattern, selects the first number of pages changed within the predetermined length of time or the second number of pages changed within the predetermined length of time.

3. The electronic device according to claim 2, further comprising a pressure detection unit, wherein
the control unit detects the contact pattern as the pressure detected by the pressure detection unit.

4. The electronic device according to claim 2, wherein the control unit alters vibration of the vibration unit in accordance with the first number of pages changed within the predetermined length of time or the second number of pages changed within the predetermined length of time.

5. The electronic device according to claim 4, wherein the control unit alters vibration of the vibration unit by altering a drive signal provided to the vibration unit.

6. The electronic device according to claim 1, wherein the control unit causes the vibration unit to vibrate the contact detector, according to the object displayed by the display unit at the contact, in a manner with changing a display page, or in a manner without changing a display page.

7. A control method for an electronic device provided with a display unit, a contact detector and a vibration unit, the control method comprising the steps of:
detecting contact to the contact detector;
while the contact detector continuously detects contact, changing a display page on the display unit upon detection of the contact to the contact detector;
causing the vibration unit to vibrate the contact detector, within a time required for the change of the display page, with a first vibration pattern having within a predetermined length of time a first amplitude or a first frequency of vibration in accordance with a first number of pages changed within the predetermined length of time, and a second vibration pattern having within the predetermined length of time a second amplitude or a second frequency of vibration in accordance with a second number of pages changed within the predetermined length of time, wherein the first amplitude or first frequency of vibration is different than the second amplitude or the second frequency of vibration, wherein the first number of pages is different than the second number of pages, and wherein the predetermined length of time for the first vibration is the same as the predetermined length of time for the second vibration;
when the contact detector no longer detects the contact, to stop changing the display page on the display unit and stop causing the vibration unit to vibrate the contact detector; and
causing the vibration unit to vibrate the contact detector differently according to an object displayed by the display unit at the contact, wherein the predetermined length of time is less than a changing the display page length of time.

8. The control method according to claim 7, wherein the vibration unit vibrates the contact detector, according to the object displayed by the display unit at the contact, in a manner with changing a display page, or in a manner without changing a display page.

* * * * *